United States Patent [19]
Bonino et al.

[11] Patent Number: 5,531,580
[45] Date of Patent: Jul. 2, 1996

[54] MACHINE FOR INJECTION BLOW MOLDING

[75] Inventors: Joseph S. Bonino, Vineland; Philip Sieri; John F. Glowacki, both of Millville, all of N.J.

[73] Assignee: Wheaton Inc., Millville, N.J.

[21] Appl. No.: 412,734

[22] Filed: Mar. 29, 1995

[51] Int. Cl.⁶ .......................... B29C 49/56; B29C 49/78
[52] U.S. Cl. .......................... 425/136; 425/138; 425/150; 425/450.1; 425/541
[58] Field of Search .................................... 425/541, 522, 425/533, 537, 136, 138, 139, 150, 450.1, 451, 451.4, 451.9, 152, 153, 171, 589

[56] References Cited

U.S. PATENT DOCUMENTS

| | | | |
|---|---|---|---|
| 2,854,691 | 10/1958 | Strong | 425/541 X |
| 3,850,560 | 11/1974 | Farrell | 425/150 |
| 3,924,987 | 12/1975 | Mehnert | 425/541 X |
| 3,947,181 | 3/1976 | Desjonqueres | 425/541 X |
| 4,561,626 | 12/1985 | Black | 425/451.9 X |
| 4,749,350 | 6/1988 | Fritsch | 425/451 X |
| 4,832,592 | 5/1989 | Saumsiegle | 425/450.1 X |
| 4,878,828 | 11/1989 | Wollschlager et al. | 425/589 X |
| 5,250,238 | 10/1993 | Kiefer et al. | 425/150 X |

OTHER PUBLICATIONS

Commercial use of the VBM 32–12 injection blow molding system by the assignee in 1965. The VBM 32–12 had a rotating crank shaft assembly for raising and lowering the movable platen to which the top halves of the parison and blow molds were coupled. Rotation of the crank shaft was translated into vertical movement of the movable platen. Pneumatic pressure was applied to the tie bars supporting the movable platen to counterbalance the weight thereof. The turret indexing mechanism was coupled to the crank assembly by a timing belt.

*Primary Examiner*—Richard L. Chiesa
*Attorney, Agent, or Firm*—Ratner & Prestia

[57] ABSTRACT

A non-hydraulic injection blow molding machine for making hollow plastic articles. The machine has a parison mold having top and bottom portions for injecting a parison onto each of a plurality of core rods, and a blow mold having top and bottom portions for blowing the parisons into hollow work pieces. The articles are removed from the core rods at an eject station. The core rods are mounted on a turret. The turret rotates to advance the core rods from the parison mold to the blow mold, and from the blow mold to the eject station. The machine has a rotating crank shaft. A translating mechanism translates the rotation of the crank shaft to a vertical reciprocating motion. A clamp beam is connected to the translating mechanism and is actuated by rotation of the crank shaft to move between raised and lowered positions which are separated by a fixed stroke. A non-hydraulic actuating mechanism, which may be a pneumatic mechanism, is connected to the clamp beam for positioning the top portion of each of the parison and blow molds relative to the clamp beam, so that the distance between the top and bottom portions of each respective mold is less than the stroke while the clamp beam is in the raised position. The pneumatic clamping pressure is applied to each of the parison and blow molds when the clamp beam is actuated to the lowered position.

27 Claims, 14 Drawing Sheets

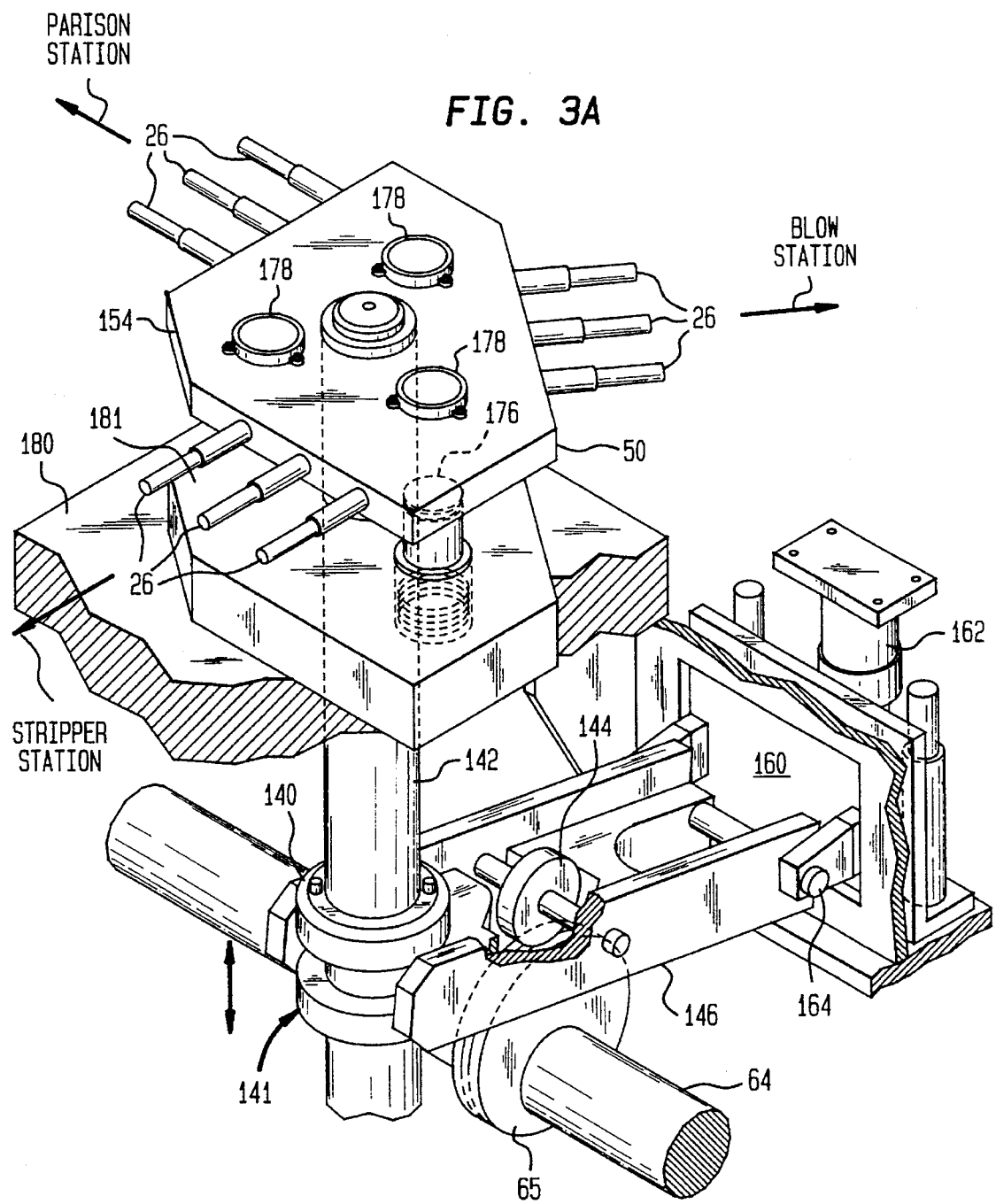

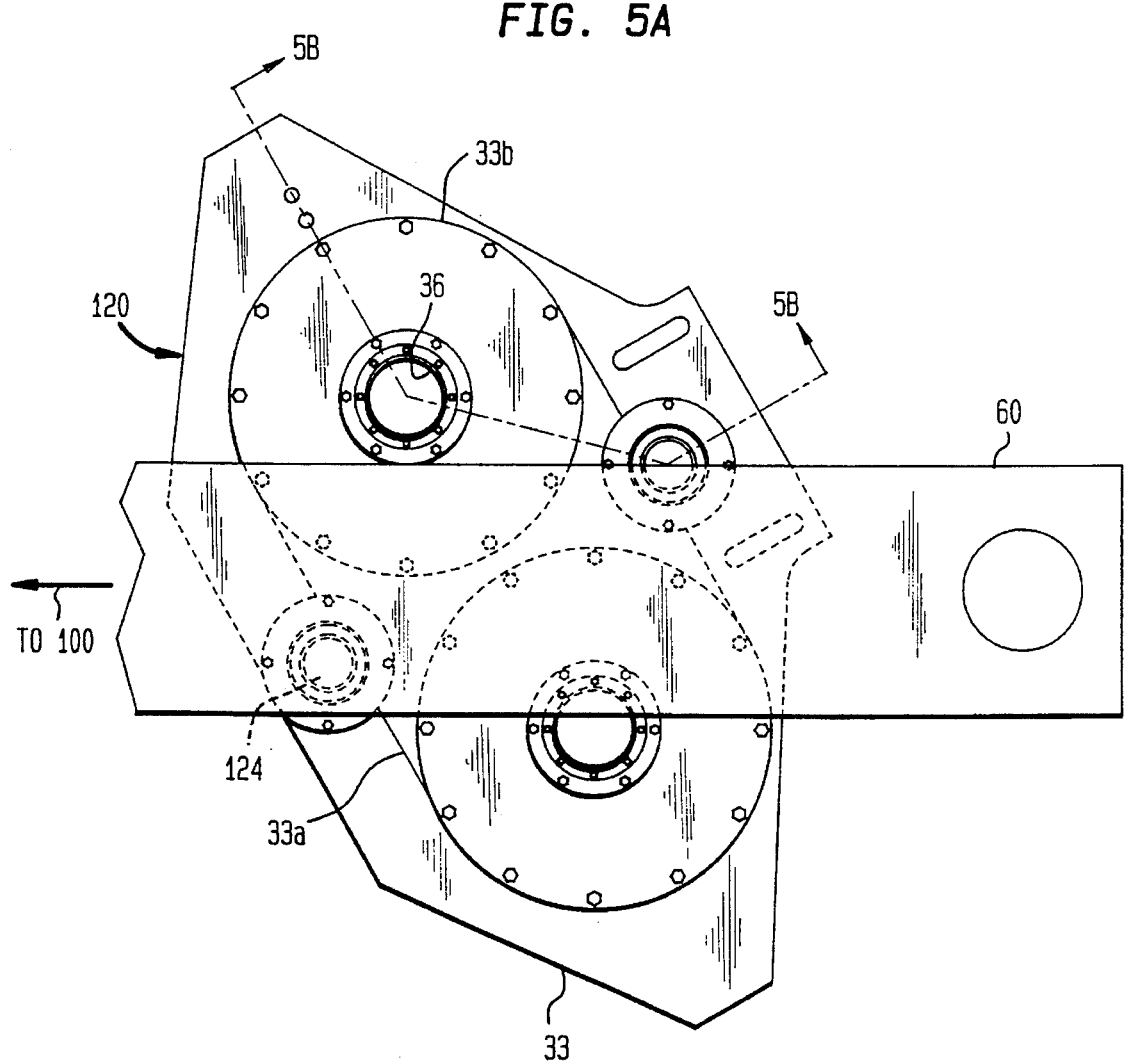

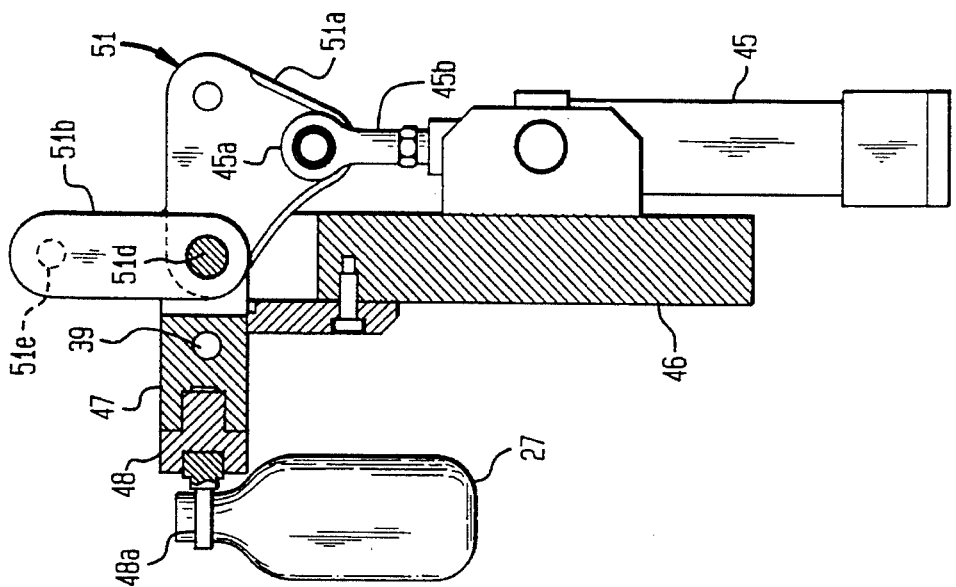
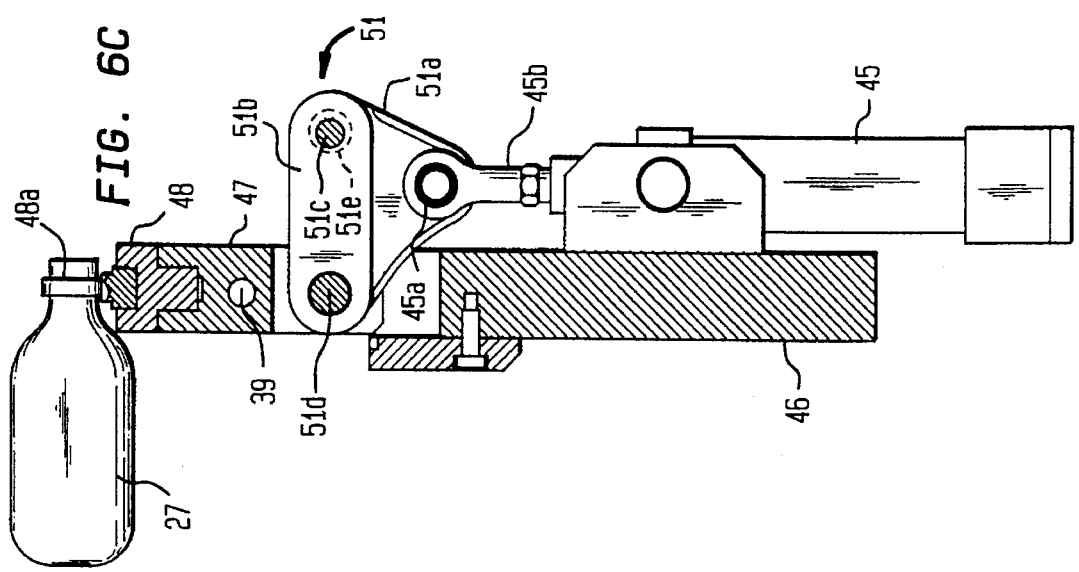

MACHINE FOR INJECTION BLOW MOLDING

FIELD OF THE INVENTION

The present invention relates to Injection Blow Molding machines for manufacture of hollow plastic articles.

BACKGROUND OF THE INVENTION

In a conventional injection blow molding (IBM) machine, a preform or parison is injection molded into a mold, around a core rod. The injection mold is opened and the core rod and the parison are transferred to a blow molding station. The parison is then blown into the shape of the final article inside the blow mold. The blow mold is opened and the blown article is advanced to a station where it is stripped off the core rod.

Prior injection and injection blow molding machines include horizontally split mold halves with mold closure pressure applied by vertically actuated mold clamps. These clamps require tremendous amounts of hydraulic pressure to hold the mold halves closed during injection of the molding material. This is due to the extremely high injection pressures developed upon parison formation. Such force requires a very stable structure to which the force from the mold halves is transferred, as well as extremely close tolerances on the mold halves to prevent torquing and deformation of the mold halves under such great pressure. Hydraulic pressurized equipment provides precise force control of mold clamp thrust.

Although the hydraulic equipment performs the clamping function effectively, the presence of hydraulic equipment makes conventional IBM equipment ill suited for use in a clean-room environment. Minute quantities of the hydraulic fluid may escape from the press clamping mechanism. The hydraulic fluid that escapes may capture dust, bacteria and molds that are present in the air. The bacteria and molds reproduce, contaminating the clean environment.

Another feature of prior art injection blow molding systems is the use of separate mechanisms for: (1) raising and lowering the top halves of the parison and blow molds, and (2) the clamping mechanism for resisting the injection pressure. In a typical IBM machine of the prior art, a counterbalancing force is applied to the offset the weight of the press, so that a relatively small force is required to raise or lower the press (much smaller than the clamping force needed during injection). Thus, separate mechanisms are used to provide: (1) the small raising and lowering force; and (2) the large clamping force.

Alternate methods and machinery for performing the press clamping functions are desired.

SUMMARY OF THE INVENTION

The present invention is a press clamping apparatus for use in an injection blow molding machine that makes hollow plastic articles. The machine includes a parison mold having top and bottom portions for injecting a parison onto each of a plurality of core rods, and a blow mold having top and bottom portions for blowing the parisons into hollow work pieces. The press clamping apparatus comprises a rotating crank shaft. A mechanism is provided for translating the rotation of the crank shaft to a vertical reciprocating motion.

A clamp beam is connected to the translating mechanism and actuated by rotation of the crank shaft to move between raised and lowered positions which are separated by a fixed stroke.

A non-hydraulic actuating mechanism is connected to the clamp beam for positioning the top portion of each of the parison and blow molds relative to the clamp beam. The actuating mechanism maintains a distance between the top and bottom portions of each respective mold less than the stroke of the clamp beam, while the clamp beam is in the raised position. The actuating mechanism applies a clamping pressure to the parison and blow molds when the clamp beam is actuated to the lowered position.

According to another aspect of the invention, the actuating mechanism includes a pneumatic mechanism for applying pressure to the parison and blow molds.

According to yet another aspect of the invention, the press clamping apparatus is included in an injection blow molding machine for making hollow plastic articles. The injection blow molding machine includes an eject station at which the articles are removed from the core rods; and a turret on which the plurality of core rods are mounted. The turret rotates to advance the core rods from the parison mold to the blow mold, and from the blow mold to the eject station. The turret is coupled to the crank shaft, to raise the turret when the clamp beam is raised, and to lower the turret when the clamp beam is lowered.

BRIEF DESCRIPTION OF THE DRAWINGS

FIG. 3A is an isometric view of the turret shown in FIG. 1A and the coupling that connects the turret to the crank shaft shown in FIG. 1A.

FIG. 5A is a plan view of the blow mold platen shown in FIG. 1A.

FIGS. 6C–6E are rear side elevation views of the stripper shown in FIG. 6A.

OVERVIEW

Figure 1A:
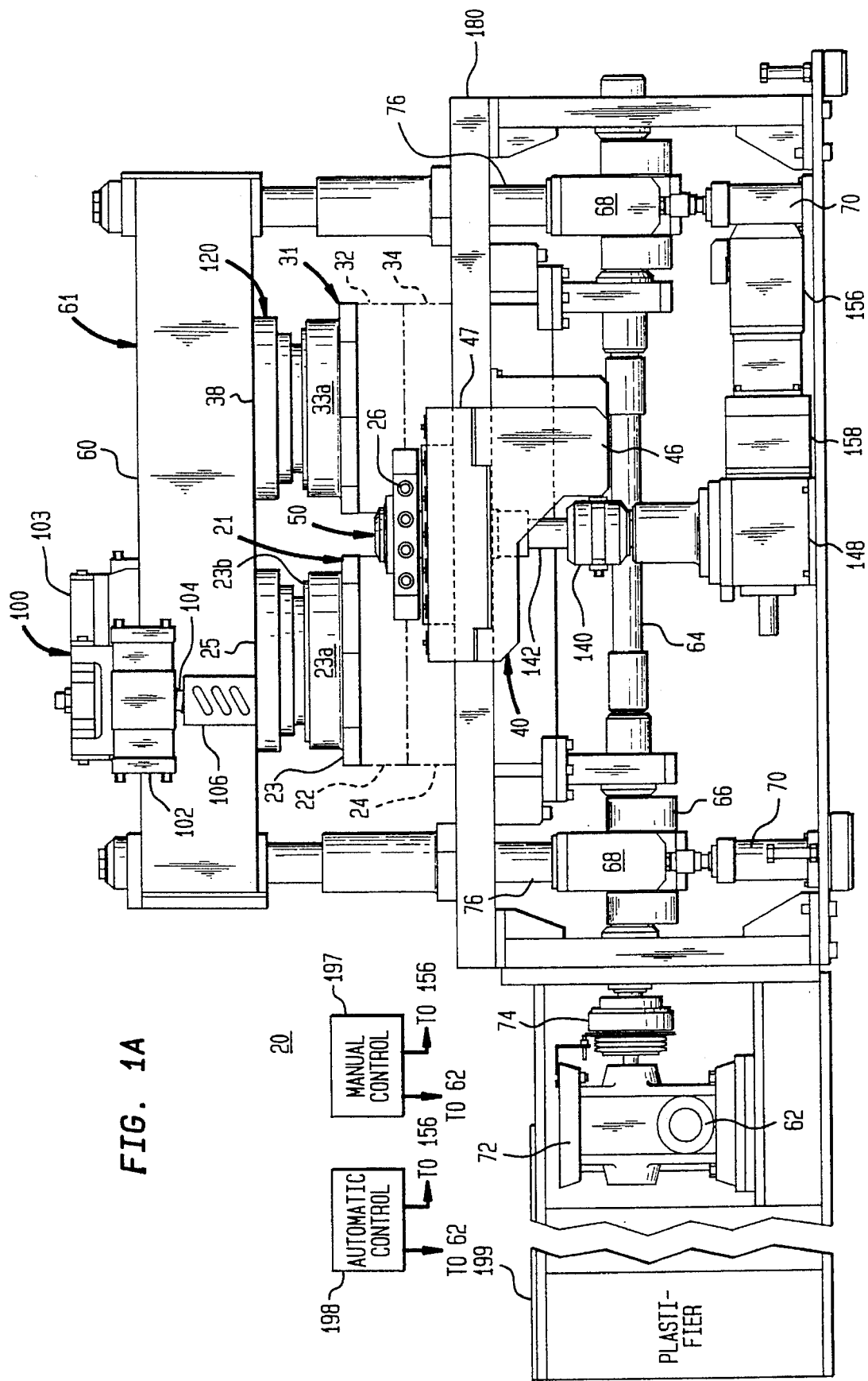
FIG. 1A is a front elevation view of an exemplary injection blow molding machine according to the invention, with the clamp beam in the lowered position.

FIG. 1A is an elevation view of an exemplary injection blow molding apparatus 20 according to the invention.

Injection blow molding machine 20 is suitable for making hollow plastic articles, such as bottles 27 (shown in FIG. 6C).

The machine 20 of FIG. 1A includes a parison mold 21 having a top portion 22 and a bottom portion 24 for injecting a parison around each of a plurality of core rods 26. A blow mold 31 has a top portion 32 and a bottom portion 34 for blowing the parisons into hollow work pieces. The machine also includes an eject station 40 (or a stripper station), at which the articles 27 are removed (or stripped) from the core rods 26.

Figure 1B:
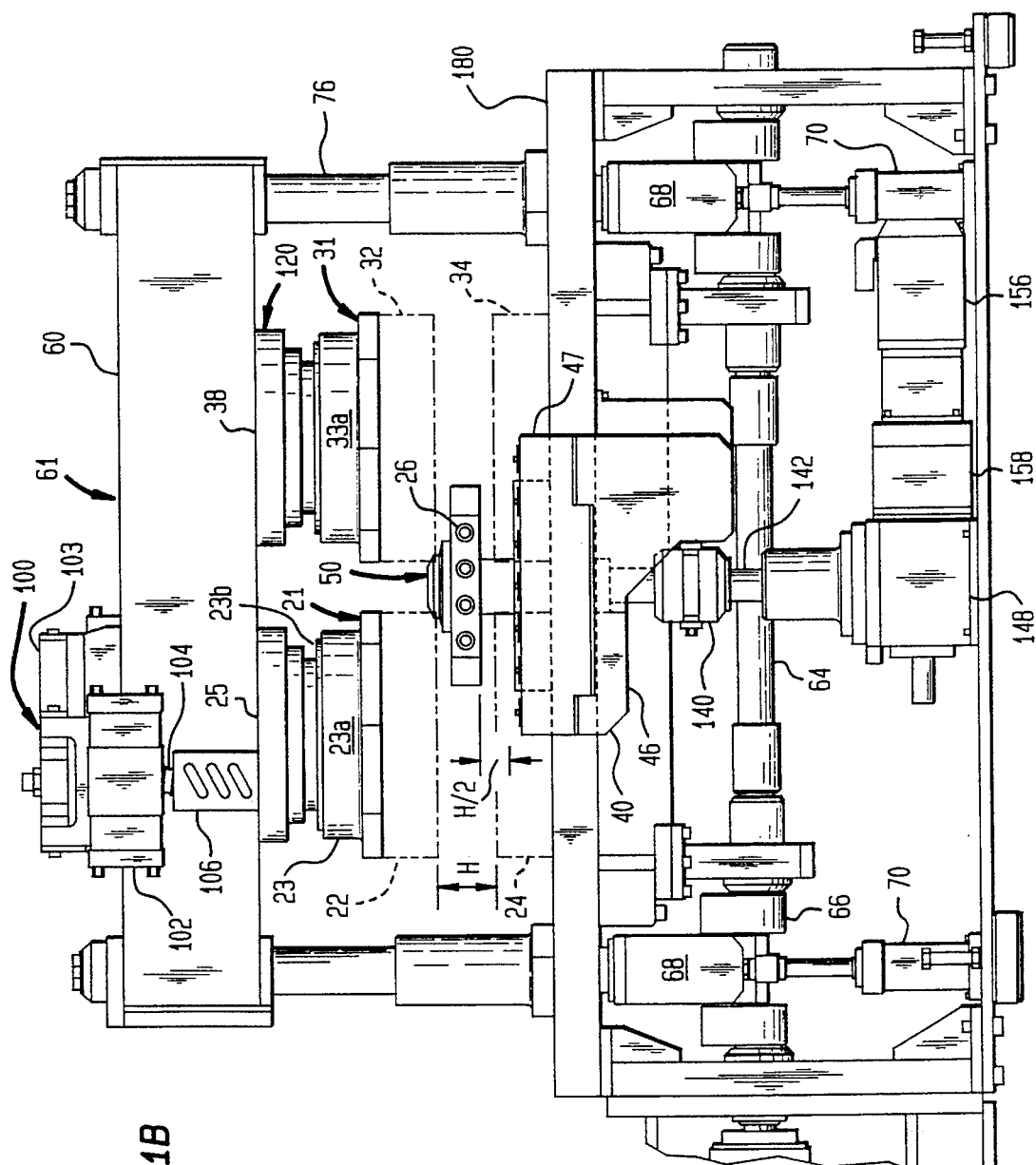
FIG. 1B is a front elevation view of the machine of FIG. 1A, with the clamp beam in the raised position.

On a three-station machine, such as the one shown in FIGS. 1A and 1B, the parison mold 21, blow mold 31, and eject station 40 are positioned 120 degrees from one another, around a turret 50, on which the plurality of core rods 26 are mounted. The exemplary machine 20 uses a conventional three station process to form articles, as is well known to those skilled in the art. As is well known to those skilled in the art, principles used in three station machines are also useful in four station machines. The hydraulic-free configuration of the present invention may be easily adapted to a four station machine, wherein each station is spaced 90 degrees apart.

In the injection blow molding process, the melted plastic, or melt, is formed in a plastifier 199, which may be of a conventional type well known in the art. The melt is injection molded into the parison mold 21, around the core rods 26. When the parisons are formed, the press clamping system 61 is then opened and the parisons are transferred to the blow mold 31. The turret 50 raises and rotates 120 degrees to advance the parisons on the core rods 26, from the parison mold 21 to the blow mold 31. The turret 50 is lowered. The press closes, in turn closing the blow mold 31 around the parison and core rods 26 and the parisons are then blown into their final shape. The press clamping system 61 again opens. Then, the turret 50 rotates 120 degrees again, to advance the blown articles 27 from the blow mold 31 to the eject station 40. Once the press closes, the articles 27 are stripped off the core rod 26 and either placed onto a conveyor or dropped into a box. While the machine 20 is operating in steady-state, all three steps (parison injection, blow molding and finished article removal) are performed concurrently on three respectively different sets of workpieces at the three stations 21, 31 and 40.

The present invention is embodied in an advantageous mechanical configuration for an injection blow molding machine. This configuration is particularly advantageous in (but not limited to) an exemplary machine 20 powered solely by electro-mechanical and pneumatic means, without the use of hydraulically powered equipment. The use of electro-mechanical and pneumatic power renders an injection blow molding machine in accordance with the invention suitable for use in a clean room environment. For example, a machine according to the invention may be used in the same room in which the bottles produced by the machine are filled with pharmaceuticals. Electrical and pneumatic pressure controlled equipment replaces the hydraulic equipment used in the prior art. To develop thrust comparable to that of hydraulic press equipment, low friction screw devices may be used to complement the pneumatic devices.

The exemplary press clamping system 61 includes a clamp beam 60, a parison mechanism 100 (including parison mold 21) and a blow molding mechanism 120 (including blow mold 31). The parison mold 21 and blow mold 31 are supported from the clamp beam 60 by the parison mechanism 100 and the blow molding mechanism 120, respectively. A rotating crank shaft 64 is powered by an electrical motor 62, and in turn provides power to actuate the clamp beam 60. A translating means is provided for translating the rotation of the crank shaft 64 to a vertical reciprocating motion. The translating means may include a Scotch yoke mechanism 68, as shown in FIGS. 1A, 1B, 2A and 2B. Clamp beam 60 is in turn connected to the Scotch yoke mechanism 68.

When the crank shaft 64 rotates, the clamp beam 60 moves between a lowered position (FIG. 1A) and a raised position (shown in FIG. 1B). The raised and lowered positions are separated by a fixed stroke (The fixed stroke is equal to twice the distance R shown in FIG. 2A). Supporting means are provided for counterbalancing the weight of the clamp beam 60. In the exemplary machine 20, the supporting means is a pneumatic supporting means comprising pneumatic cylinders 70 at each end of the crank shaft 64, as shown in FIGS. 1A and 1B. The pneumatic supporting means reduces the torque that is needed to rotate the crank shaft 64 when raising the clamp beam 60.

The clamping system 61 is so named because it provides a clamping function in addition to the raise and lower function. No only does the clamping system 61 raise and lower the clamp beam 60, it also provides a means to lock the clamp beam in the lowered position, applying clamping pressure to the parison and blow molds 21 and 31 (Unlike conventional systems which employed a clamping mechanism separate from the raising and lowering mechanism). The pressure within the molds 21 and 31 applies an upward force on clamp beam 60. This force is resisted by crank shaft 64. Thus the crank shaft 64 is used to lock the press clamping system 61 in the closed position to resist the high pressures in molds 21 and 31. In the lowered position, the crank shaft 64 is at its bottom dead center position, so the upward force from the mold pressure does not apply any torque to crank shaft 64.

Figure 2A:
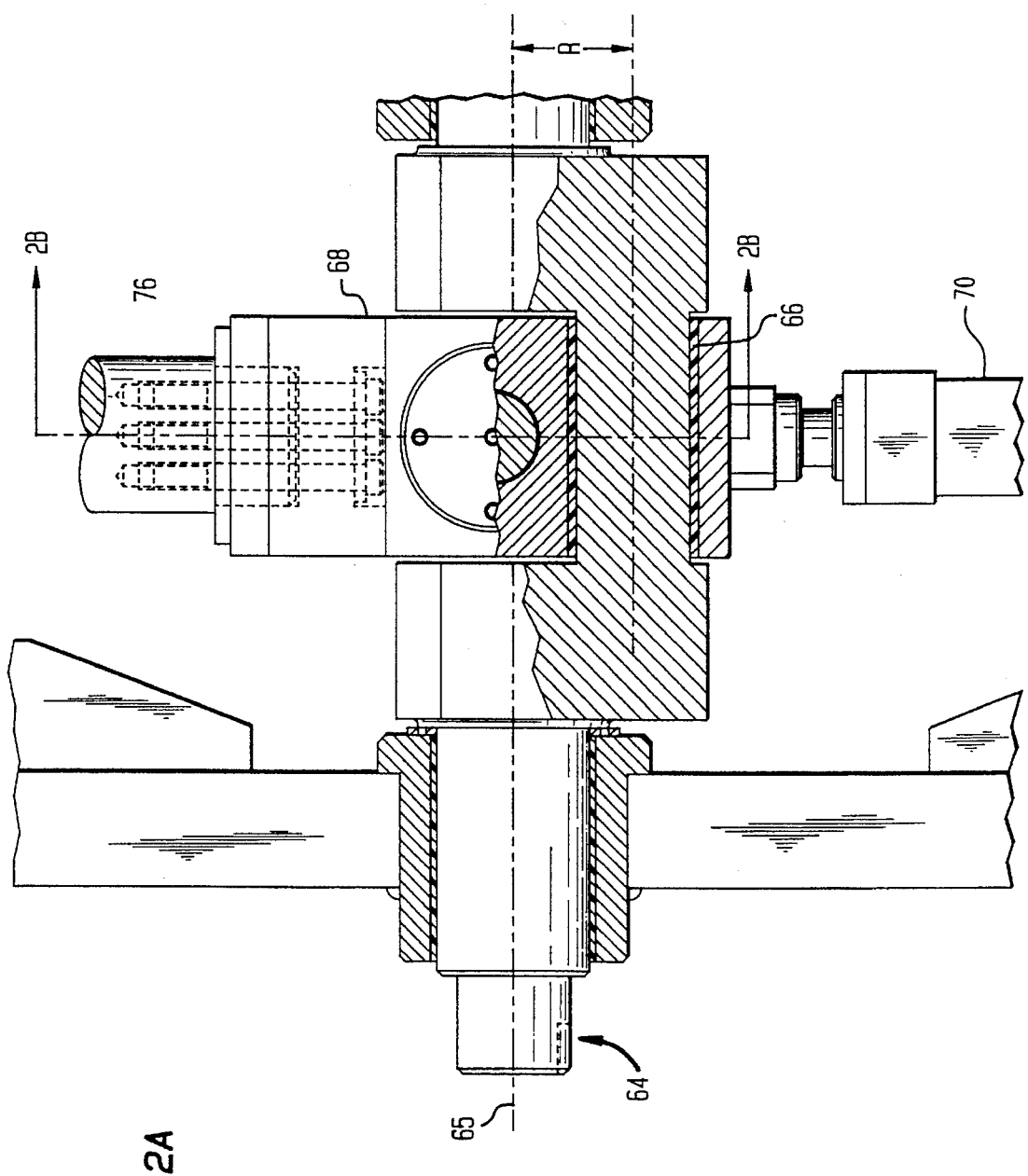
FIG. 2A is an enlarged, partial cut-away view of the Scotch yoke assembly shown in FIG. 1A.

Actuating mechanisms (described with reference to FIGS. 4B and 5B) are connected to the clamp beam 60 for positioning the top portion 22 of the parison mold 21 and the top portion 32 of the blow mold 31 relative to the clamp beam 60. Referring to FIG. 1B, the distance H between the top portion 22 and bottom portion 24 of parison mold 21 is slightly less than the stroke (2*R) of the clamp beam 60 while the clamp beam is in the raised position (where the distance R is shown in FIG. 2A). Thus, the respective clamp mechanisms 100 and 120 are backdriven to accommodate the fixed mold stack height, and the clamp system 100 provides compliance. Similarly, the distance H between the top portion 32 and bottom portion 34 of blow mold 31 is less than the stroke (2*R) of the clamp beam 60 while the clamp beam is in the raised position. In the exemplary embodiment, the actuating mechanism is pneumatically driven. The pneumatic mechanisms apply a pneumatic clamping pressure to the parison mold 21 and blow mold 31, when the clamp beam 60 is actuated to the lowered position.

According to another aspect of the invention, a mechanical coupling is provided to raise the turret 50 when the crank shaft 64 rotates to raise the clamp beam 60, and to lower the turret 50 when the crank shaft lowers the clamp beam. Crank shaft 64 provides the motive force to raise both the clamp beam 60 and the turret 50. The coupling means raises turret 50 by one half of the distance through which the clamp beam 60 moves, to maintain the core rods 26 approximately midway between the top and bottom portions 22 and 24 of parison mold 21. Core rods 26 also are maintained midway between the top and bottom portions 32 and 34 of blow mold 31.

According to another aspect of the invention, the eject station 40 includes a stripper actuated without hydraulic controls.

According to another aspect of the invention, a plurality of safety cutoff mechanisms are included in the system.

These and other aspects of the invention are described in detail below with reference to the exemplary embodiments.

Although the exemplary embodiment described in detail herein includes both electro-mechanical and pneumatic components, one of ordinary skill in the art could readily apply the principles and mechanical configuration set forth below to construct an injection blow molding machine in which one or more of the members to which pneumatic force is applied is instead loaded by an electrical and/or mechanical system. For example, the clamp beam 60 may be counterbalanced using weights instead of pneumatic pressure.

Moreover, although the exemplary embodiment is configured without any hydraulic equipment, the principles and configuration of the invention may be applied to injection blow molding systems that include hydraulic equipment. For example, hydraulic pressure may be used to counterbalance the weight of the clamp beam 60 or to apply clamping force in the parison and blow mold clamping mechanisms 100 and 120.

DETAILED DESCRIPTION OF THE EXEMPLARY EMBODIMENT

FIG. 1A shows the exemplary Press Open/Close mechanism, which comprises an electric motor 62, a reducer 72, a safety clutch 74, two yoke assemblies 68, two tie bars 76 and a press clamp system 61 (including clamp beam 60).

The motor 62 is coupled to a reducer 72, which may be, for example, a single reduction worm gear having a 50:1 reduction ratio. This allows precise control of the speed and position of crank shaft 64. Reducer 72 is connected to crank shaft 64 via a safety clutch 74. The safety clutch allows the reducer output to disengage from the crank shaft if the crank shaft becomes stuck in any position (for example, if the top and bottom portions of molds 21 and 31 become stuck together, preventing the crank shaft 64 from rotating).

Figure 2B:
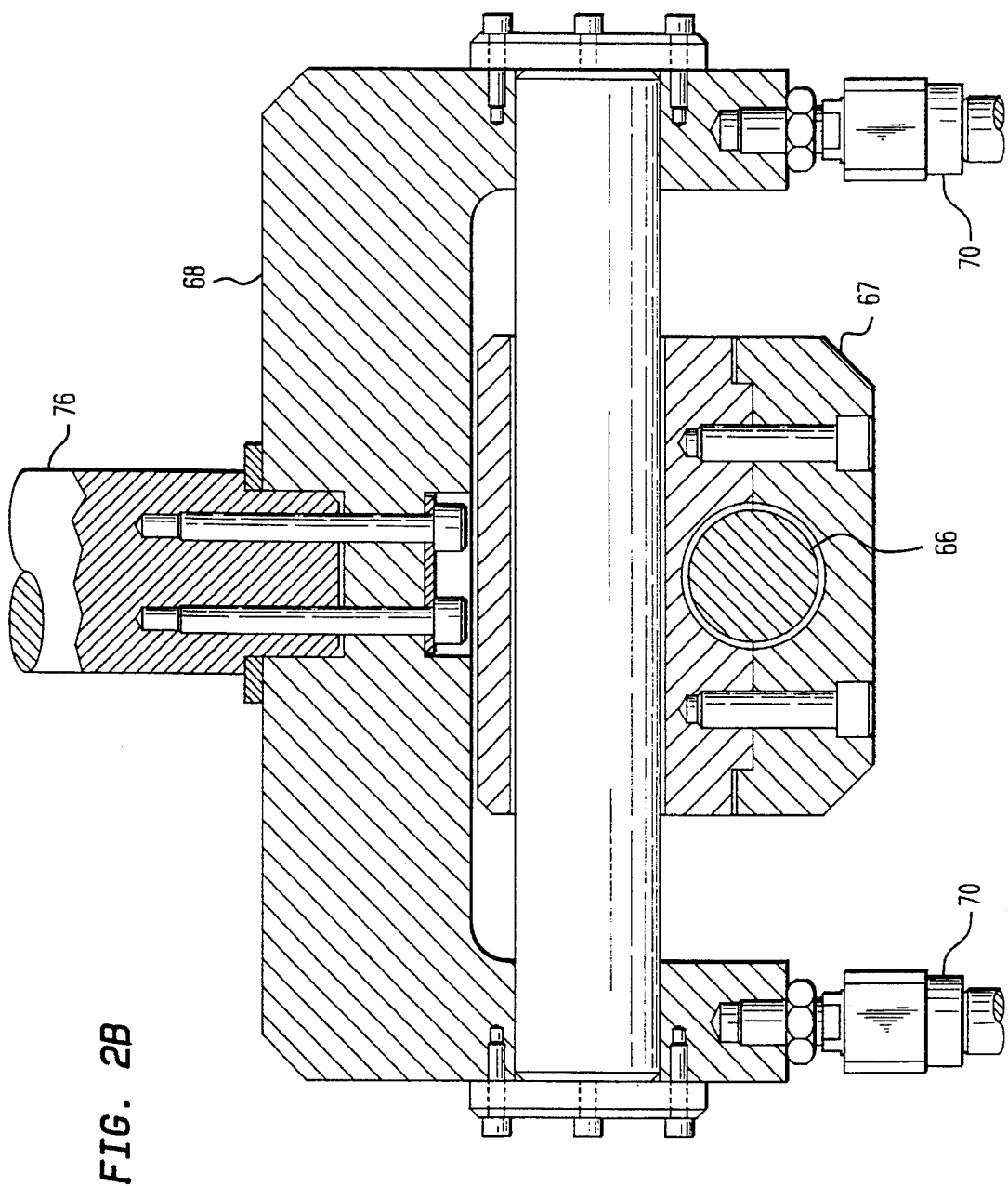
FIG. 2B is a cross sectional view of the Scotch yoke assembly shown in FIG. 2A, taken along line 2B—2B.

FIGS. 2A and 2B show the exemplary press open/close mechanism. FIG. 2A is an enlarged, partial cut-away front elevation view of the Scotch yoke assembly 68 shown in FIG. 1A. FIG. 2B is a side elevation cross sectional view of the Scotch yoke assembly 68. The crank shaft 64 has two radially displaced sections 66, which provide an eccentric throw. Sections 66 rotate about the central axis 65 of crank shaft 64, when shaft 64 rotates. Sections 66 are offset from the axis 65 by a distance R, as shown in FIG. 2A. Thus, the stroke of the clamp beam 60 (distance traveled between lowered and raised position) is 2*R.

The rotary motion of crank shaft 64 is translated into vertical press motion by two X & Y blocks 67 and two yokes 68 (forming the Scotch yoke mechanism). The yokes 68 are each attached to tie bars 76 which carry the press clamp beam 60 (FIG. 1A) along with the upper parison platen 23 and blowmold platen 33, and the respective top mold halves 22 and 32. The actuation of the press clamp system 61 is accomplished by rotating the crank shaft 64 to a preset vertical top center position (FIG. 1B) for press open and bottom center position (FIGS. 1A and 2A) for press close.

Figure 4A:
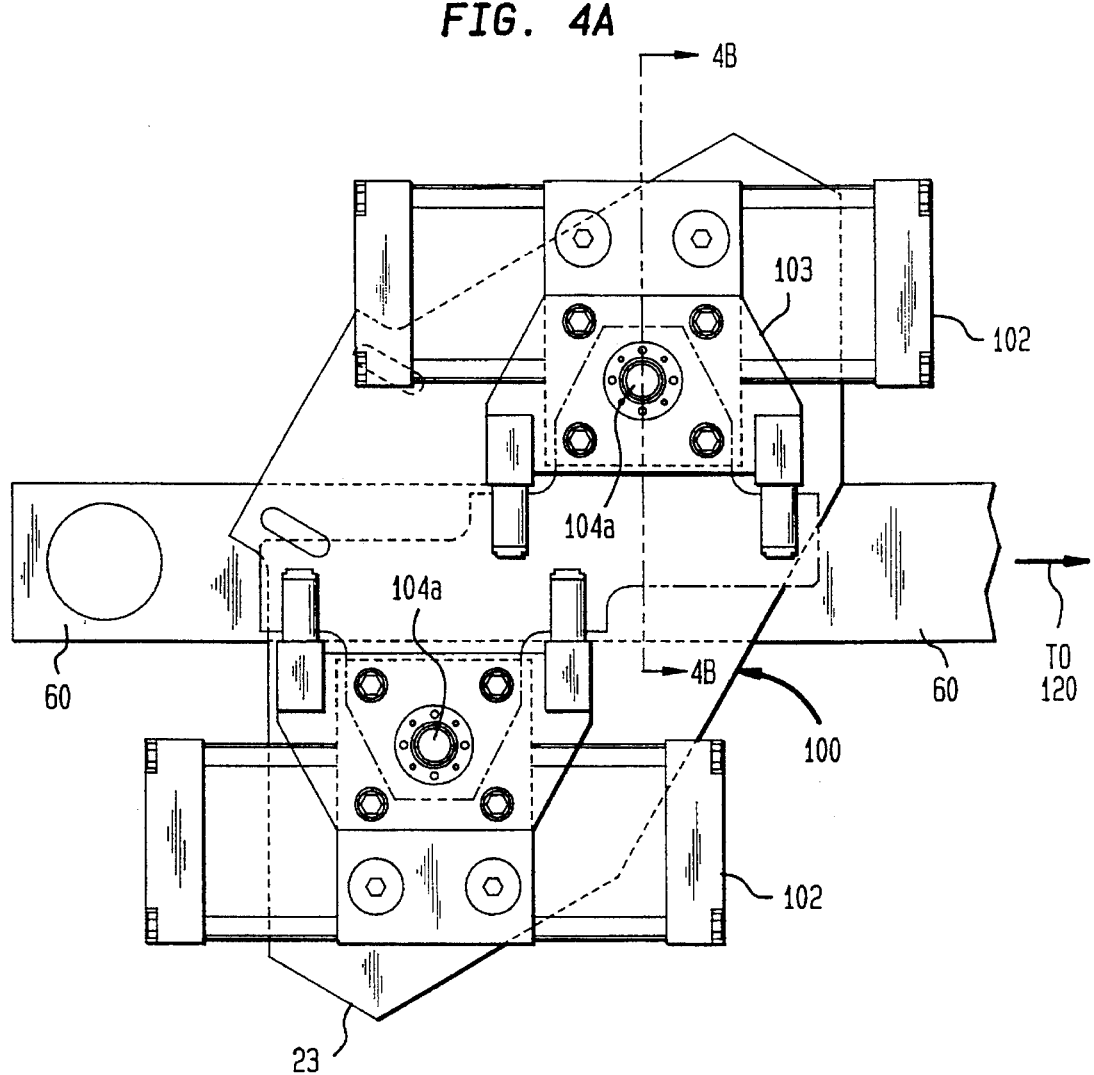
FIG. 4A is a plan view of the parison mold platen shown in FIG. 1A.
Figure 4B:
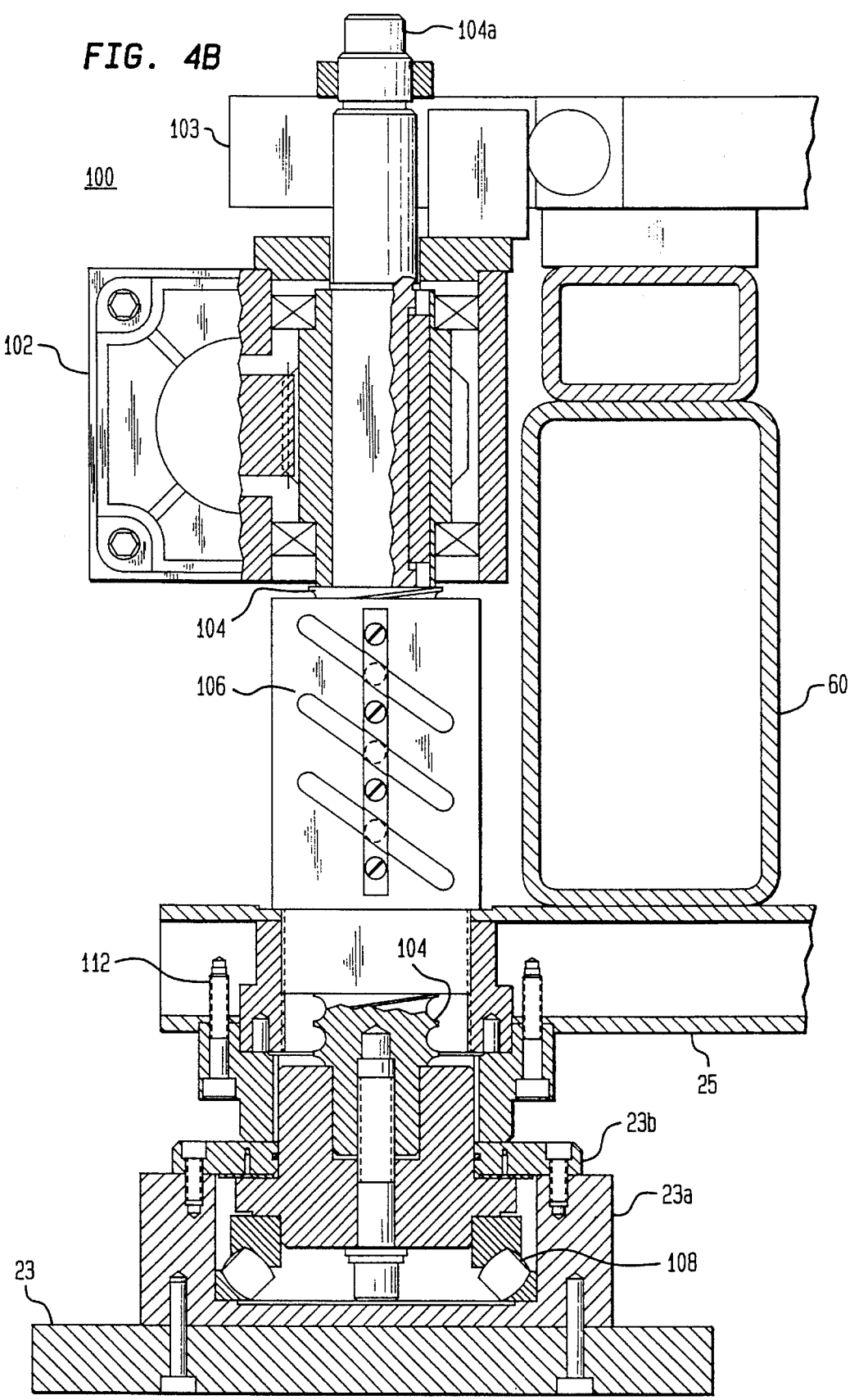
FIG. 4B is a cross sectional view of the mechanical and pneumatic controls for the parison mold platen shown in FIG. 4A, taken along the line 4B—4B.
Figure 5B:
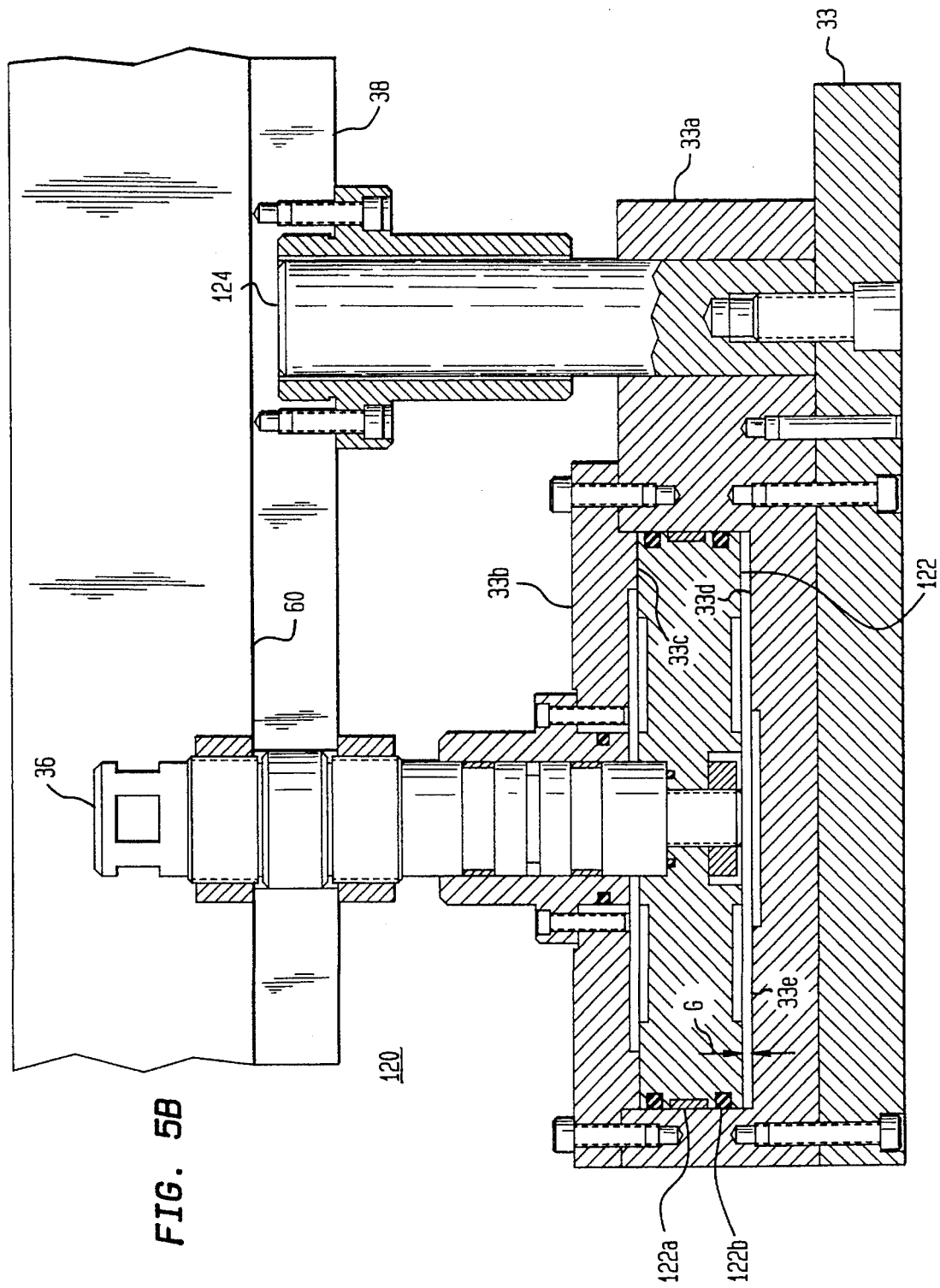
FIG. 5B is a cross sectional view of the pneumatic controls for the blow mold platen shown in FIG. 5A, taken along line 5B—5B.

The press clamp system 61 comprises a clamp beam 60, a parison mechanism 100 (best seen in FIGS. 4A and 4B) and a blow mold clamp mechanism 120 (best seen in FIGS. 5A and 5B). The weight of the clamp system 61 is counterbalanced by the use of pneumatic cylinders 70 which are attached to the yokes 68 and pressurized by an accumulator (not shown). The preset force exerted by the counterbalancing cylinders 70 is greater than the total force exerted by the weight of the clamp system 61, thus maintaining the press in the open position (shown in FIG. 1B) unless otherwise acted upon by the crank shaft 64.

As described above, with the press clamping system 61 closed (in the lowered position), pressure within molds 21 and 31 applies an upward force on clamp beam 60. This force is resisted by crank shaft 64. With clamp beam 60 in the lowered position, the crank shaft 64 is at its bottom dead center position. So long as crank shaft 64 remains at the bottom dead center position, the pressure force is applied through the center of rotation of the crank shaft 64, and pressure forces from the molds will not apply any torque to crank shaft 64 (a pure force); the pressure forces will not tend to rotate shaft 64.

Additionally, exemplary motor 62 is a servo motor having a driving gear box that locks the crank shaft at the bottom dead center position. The exemplary servo motor provides a stall torque that is as great as the torque applied to rotate the crank shaft 64 when raising clamp beam 60, so that the crank shaft 64 is effectively locked in the bottom dead center position. Because the clamping force does not apply any additional torque to the crank shaft 64 while the shaft is at the bottom dead center position, the stall torque of the motor is sufficient to resist any rotation of the crank while the press is closed. Thus, crank shaft 64 serves both to raise and lower the clamp beam 60 and to lock beam 60 in the lowered position to resist the upward force exerted on clamp beam 60 by molds 21 and 31.

FIG. 4A is a plan view showing the parison clamp mechanism 100, and the portion of clamp beam 60 to which it is attached. FIG. 4B is a cross sectional view taken along line 4B—4B of FIG. 4A. Parison clamp mechanism 100 comprises two pneumatic rotary actuators 102, two ball screws 104, two ball nuts 106, two thrust bearings 108 and a parison platen 23. FIG. 4B shows a single actuator 102, ball screw 104, ball nut 106 and thrust bearing 108. The remaining actuator 102, screw 104, nut 106 and bearing are identical, and are not described in detail herein.

The components of the parison clamp mechanism 100 are suspended from and anchored to the clamp beam 60 by suitable fasteners 112. Ball nut 106 is fixed to Beam 60. Ball screw 104 is rotatably mounted within ball nut 106, such that ball screw 104 moves vertically up or down within ball nut 106, when ball screw 104 is rotated. Roller thrust bearings 108 within parison platen cylinder 23a are used to transmit thrust to the parison platen 23 from the ball screw 104. Parison platen 23, parison platen cylinder 23a and retainer ring 23b all move vertically together with ball screw 104.

Rotary actuators 102 provide torque to actuate the ball screw 104. Ball screw 104 is rotatably mounted in rotary actuator 102, so that screw 104 rotates when pneumatic pressure is applied to actuator 102. Actuators 102 may be conventional rotary actuators manufactured by the Specken Drumag Company of Switzerland, for example.

To actuate the parison platen 23 relative to the clamp beam 60, pneumatic pressure is applied to rotary actuators 102. As screw 104 rotates in ball nut 106, screw 104 is actuated downward, moving platen 23.

The ball screw 104 configuration of parison clamp mechanism provides high load bearing capability and accurate position control. During the injection process, the exemplary ball screw mechanisms support a load equivalent to about 35 tons. The ball screw 104 provides an extremely low friction position control mechanism, so that the parison clamp mechanism is extremely responsive to the pneumatically controlled rotary actuators 102.

Although the exemplary embodiment includes rotary actuators 102 to provide compliance in the parison clamping mechanism 100, one of ordinary skill in the art could readily construct a mechanism for powering ball screw 104 by an electric motor instead of by pneumatic pressure.

FIG. 5A is a plan view showing the blow mold clamp mechanism 120 and the portion of clamp beam 60 to which it is mounted. FIG. 5B is a cross sectional view taken along line 5B—5B of FIG. 5A. The blow mold clamp mechanism 120 comprises two pneumatic "pancake" cylinders or pistons 122 (each of which is an integral part of the blow mold platen 33). FIG. 5B only shows one piston 122. The other piston 122 is identical and is not described in detail herein.

Blow mold clamp mechanism 120 is suspended from, and anchored to a top beam 38, which is in turn anchored to the bottom of clamp beam 60. Piston shaft 36 is attached directly to top beam 38. The pancake shaped piston 122 is attached to the bottom of piston shaft 36. Piston 122 is slidably and sealingly mounted within a cylindrical chamber 33e using a piston bearing 122a and two O-rings 122b. Chamber 33e is formed between platen cylinder 33a and cylinder cap 33b, which are attached to each other. Platen cylinder 33a is also attached to blow mold platen 33.

The height of pancake shaped piston 122 is smaller than the height of chamber 33e, forming a gap G, which is pressurized by air that is transmitted through piston shaft 36. The exemplary chamber 33e has a gap height of about 1/8 inch (0.32 centimeters). When the clamping system 61 is in the open (raised) position, gap G is positioned at the bottom of chamber 33e, as shown in FIG. 5B, and the top of piston 122 bears against the bottom surface 33c of cylinder cap 33b. Thus, with the clamping system 61 in the open position as shown, blow mold platen 33 is suspended from piston 122.

When clamping system 61 is in the closed (lowered) position (as shown in FIG. 1B), pressure is applied to the blow mold platen 33 by blow mold 32. Platen 33, platen cylinder 33b and cylinder cap 33c move upward relative to pancake shaped piston 122. The blow mold clamping mechanism 120 provides compliance.

The blow mold clamping mechanism 120 is not subjected to the same loading as the parison clamping mechanism 100. The blow mold clamping mechanism only needs to resist the air pressure inside the articles 27. In the exemplary system, the blow mold clamping mechanism is subjected to a load of about 10 tons. Consequently, the blow mold clamping mechanism 120 may be simpler than the parison clamping mechanism 100.

It is typically more cost effective to use the pancake cylinder design shown in FIGS. 5A and 5B for the blow mold clamping mechanism 120. Nonetheless, a clamping mechanism such as mechanism 100 shown in FIGS. 4A and 4B may also be adapted for use in the blow mold clamping mechanism as well as in the parison clamping mechanism.

The operation of the press clamp system 61 is now described. With the press clamp system 61 in the open position (FIG. 1B), the parison clamp mechanism 100 is energized to move the parison platen 23 and top mold half 22 to a preset distance H from the mating bottom parison mold half 24. Similarly, blow mold clamp mechanism 120 is energized to move the blow mold platen 33 and top mold half 32 to the same preset distance H from mating blow mold bottom half 34. This preset distance H is slightly less than the distance (2*R) traveled by the clamp beam 60 of press clamp system 61 when the crank shaft 64 rotates.

The respective pressures applied to the platens 23 and 33 are nominally lower when press clamp system 61 is in the open (raised) position than the pressures applied (to achieve full clamping force) when press clamp system 61 is in the closed (lowered) position. By applying pressure at all times (even when the press clamp system 61 is open), any potential play in the system is eliminated. All bearing components are thus forced to engage their respective mating surfaces/components while the press clamp system 61 is open. This avoids undesirable impact between bearing components and their mating surfaces when the full clamping pressure is later applied.

Additionally, the pressures applied to platens 23 and 33 are maintained at their reduced values for a short time after lowering the clamp system 61. For example, the pressure is reduced while the clamp system 61 is being lowered, and may remain lowered for about 0.5 seconds after the crank shaft 64 reaches the bottom dead center position. The crank shaft 64 stays closed for about 12–20 seconds while the full clamping pressure is applied. The pressure is again reduced for about 0.5 seconds before the crank shaft 64 again rotates. The crank shaft 64 is not rotated while the full pressure is applied.

The pneumatic pressure applied to the top portions 22, 32 of the parison and blow molds 21 and 31, respectively when the clamp beam 60 is not in the lowered position eliminates clearances between components in parison clamp mechanism 100 and blow mold clamp mechanism 120. The reason that the pressure applied while the press clamping system 61 is raised is reduced is to minimize wasted air due to parasitic losses.

As shown in FIGS. 1A and 2A, by rotating the crank shaft 64 to its bottom dead center position, the press clamp system 61 is lowered by a distance (2*R). This distance is greater than the preset distance H that separates the faces of the parison mold halves 22, 24 and blow mold halves 32, 34 when the press clamp system is in the raised position. Thus, the respective clamp mechanisms 100 and 120 are back-driven to accommodate the fixed mold stack height. That is, the clamp system 100 provides compliance, allowing the top half 22 of parison mold 21 to move closer to the clamp beam 60 by a distance of (2*R–H). Similarly, the clamp system 120 allows the top half 32 of blow mold 31 to move closer to the clamp beam 60 by a distance of (2*R–H). At the same time, full air pressure is applied to achieve a press clamped condition.

Once press clamping system 61 is closed, the forming cycle is initiated by injecting the preform over the core rods 26 in the parison cavity of parison mold 21, and blowing the preform into its final form in the cavity of blow mold 31. The finished articles 27 are ejected/stripped at eject station 40. When the longest station cycle time (i.e., parison formation) is finished the press clamp system 61 air pressure is reduced and the crank shaft 64 is rotated to its top dead center position (shown in FIG. 1B), thus opening the press clamping system 61. Simultaneously, turret 50 is rotated to transfer the articles 27 to the next process mold and/or station. The press clamp system 61 again closes. This completes one machine cycle.

The press clamping system also includes a conventional safety device, such as a latch (not shown), to hold the press in the open position when personnel are working in the press area (for example, when changing tooling). Such devices are well known in the art and are not described in detail herein.

TURRET COUPLING AND OPERATION

Figure 3B:
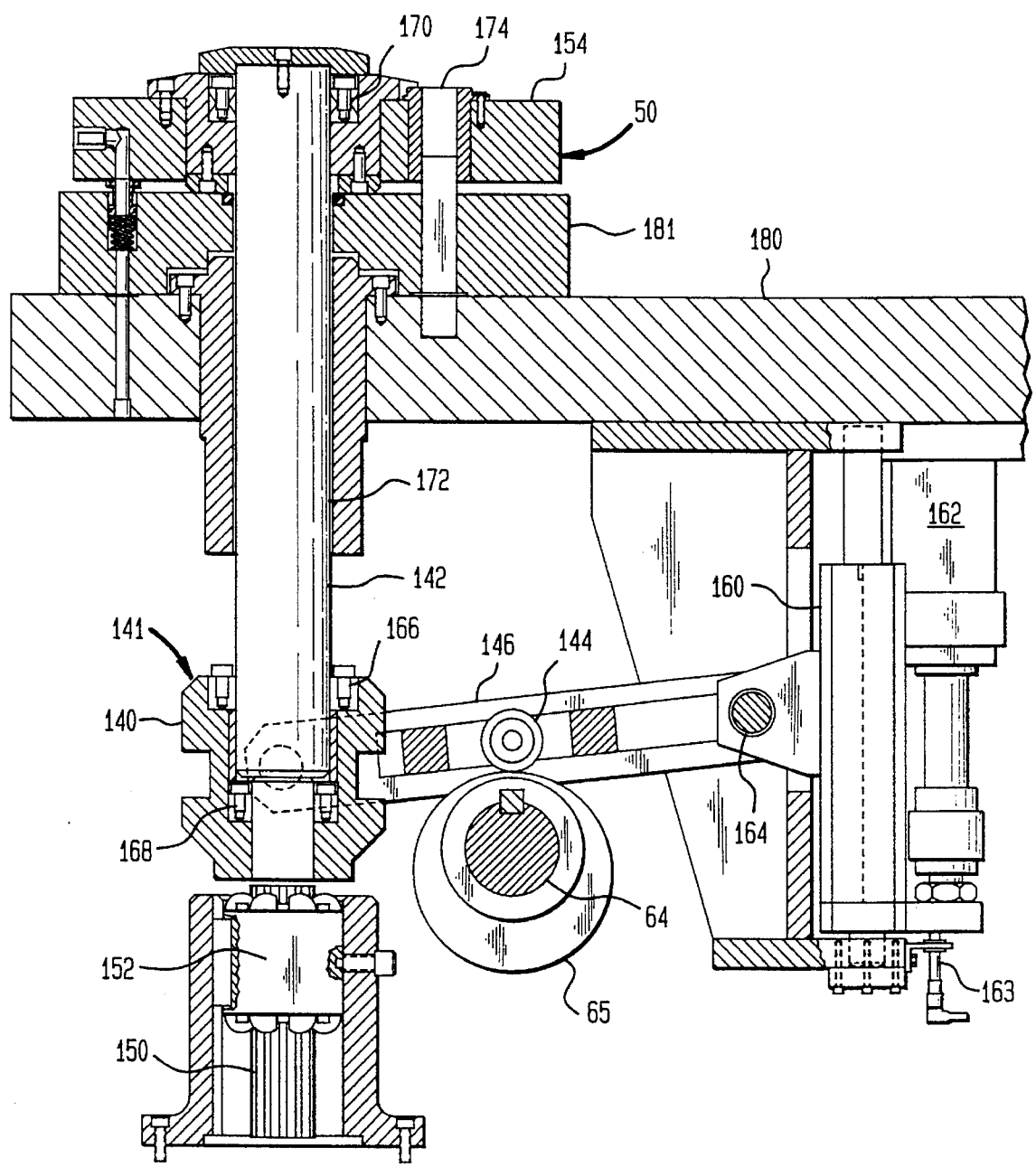
FIG. 3B is a cross sectional elevation view of the turret shown in FIG. 1A, in a normal press closed position.
Figure 3C:
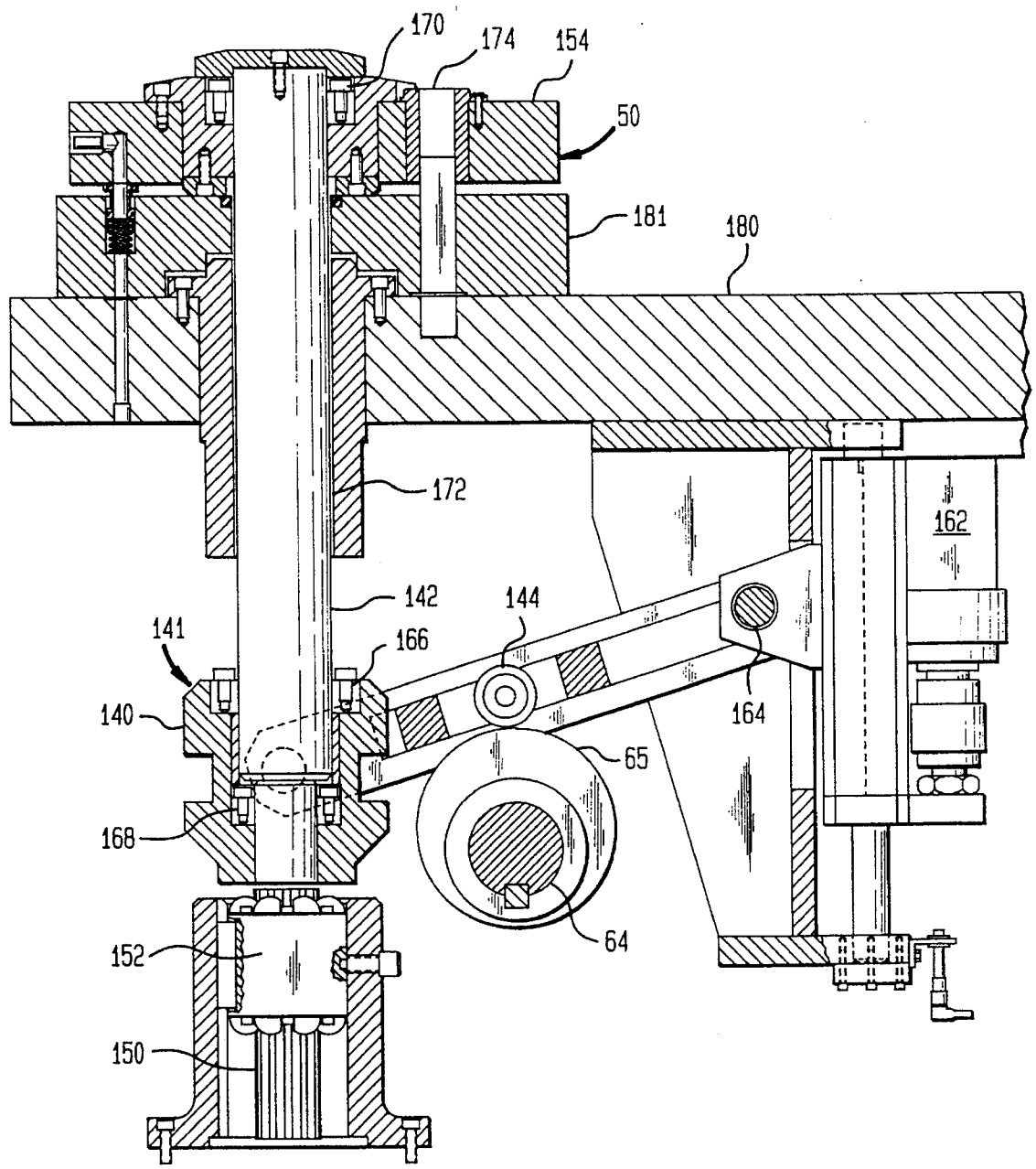
FIG. 3C is a cross sectional elevation view of the turret shown in FIG. 1A, with a safety relief function activated.

FIGS. 3A–3C show the exemplary turret mechanism 50. FIG. 3A is an isometric view of the turret 50 and the turret coupling mechanism for coupling the turret 50 and the crank shaft 64. Although the exemplary turret mechanism 50 is described with reference to a three-station injection blow molding machine, one of ordinary skill in the art could readily extend the principles described herein to a four-station machine. The turret mechanism 50 comprises a turret head 154 (also referred to as a core rod head), an eccentric cam 65 (which is an integral part of the crank shaft 64), a lift mechanism 141, an indexer 148, and a turret shaft mounting and guidance system 150, 152.

The turret lift mechanism 141 raises the turret head 154 in synchronization with the raising of the clamp beam 60 by crank shaft 64, so that turret head 154 can rotate (on lubrication free bearings). The exemplary turret lift mechanism 141 comprises a slide assembly 160, a pneumatic cylinder 162, a rotating lift spool 140, and a yoke 146 (also referred to as a yoke arm). The lift spool 140 is actuated by one end of the arm 146, and the other end of the arm 146 is attached to the slide assembly 160. Arm 146 has a cam follower 144 which engages eccentric cam 65. The rotation of the crank shaft 64 causes eccentric cam 65 to rotate. Rotation of cam 65 causes cam follower 144 to move with a vertical reciprocating motion. Movement of cam follower 144 in turn actuates the lift yoke 146.

Cam 65 is oriented so that cam 65 is in a top dead center position when crank shaft 64 is in its top dead center position (as shown in FIG. 1B). Thus there is no phase difference between the vertical motion of clamp beam 60 and the vertical motion of turret 50. The turret head 154 is raised and lowered through a distance which is at all times proportionally one half the linear travel of the press open/close mechanism 61. For example, when clamp beam 60 is raised by a distance 2*R (as shown in FIG. 1B), turret head 154 is raised by a distance R (approximately equal to H/2). By maintaining the ratio between clamp beam 60 travel and turret travel, the core rods 26 are at all times centered between the top and bottom halves 22, 24 of parison mold 21, and between the top and bottom halves 32, 34 of blow mold 31.

The pneumatic cylinder 162 and slide assembly 160 maintain a semi-fixed fulcrum point 164 during normal operation and act as a turret head overload protection mechanism during the up stroke of clamp beam 60. FIG. 3B shows the turret 50 in the lowered position. With cam 65 in its bottom dead center position, cam follower 144 is lowered, in turn lowering lift spool 140 to its lowered position. In normal operation, as shown in FIG. 3A, when cam 65 rotates to its top dead center position, cylinder 162 remains fully extended, and fulcrum 164 is stationary. As a result, cam follower 144 rises, raising lift spool 140 and turret 50.

It is possible that, due to abnormal conditions, turret 50 may become stuck in the lowered position. This may occur if, for example, the parison mold halves 22 and 24 are stuck together, or if the parisons are stuck to the bottom half 24 of the parison mold 21. If this happens, the crank shaft 64 could be damaged if the fulcrum 164 of arm 146 were rigidly fixed. In the exemplary embodiment, as shown in FIG. 3C, if turret 50 is stuck in the lowered position, rotation of the crank shaft 64 and eccentric cam 65 applies sufficient force to slide assembly 160 to compress cylinder 162. As a result, slide assembly 160 (including fulcrum 164) rises, allowing cam follower 144 to rise without moving lift spool 140. Thus, damage to crank shaft 64 is avoided. An alarm is activated in this condition when the switch 163 (shown in FIG. 3B) loses contact with cylinder 162.

It is also possible that turret 50 does not return completely to its lowered position when crank shaft 64 and cam 65 rotate to the bottom dead center position. This is an abnormal condition that may be caused by an object interfering with the lowering of turret 50. In the exemplary embodiment, cam 65 and cam follower 144 form a part of an electrical circuit path. If turret 50 does not lower properly when cam 65 rotates to its bottom dead center position, cam follower 144 loses contact with cam 65. This loss of contact causes an open circuit condition in the electrical circuit, which in turn causes generation of an alarm signal. The alarm signal may be used as an operator alert, or to automatically terminate operation of the machine 20. One of ordinary skill in the art of electrical circuit design could readily design the alarm circuit that is connected to the cam 65 and cam follower 144.

The indexing system (shown in FIG. 1A) comprises electric motor 156, a reducer 158, a cam actuated indexer 148, a ball spline 150 and nut 152. Indexer 148 is filled with a lubricating oil. The indexer 148 works in conjunction with the lift mechanism 141. As the press clamp system 61 opens and the lift mechanism 141 raises the turret head 154, the indexer 148 rotates the turret head 154 by a total of 120 degrees. The rotation of turret head 154 begins at a first preset turret lift height, and is completed at a second preset height. In the exemplary embodiment, the rotation of turret head 154 begins when the crank shaft 64 has rotated 90 degrees from the bottom dead center position, and ends when the crank shaft has rotated 270 degrees from the bottom dead center position, thus limiting the rotation of the turret head 154 to the period when clamp beam is at or above the center of its range of motion. This configuration avoids interference between the moving workpieces and the molds.

In the exemplary embodiment, an electronic control system 198 (shown in FIG. 1A) is used to automatically initiate rotation of the turret 50 when the crank shaft 64 is between 90 and 270 degrees from the bottom dead center position. One of ordinary skill in the art of programming a process controller could readily program a controller to perform this function.

The exemplary controls also may be operated in a manual mode, using manual controls 197 (shown in FIG. 1A). The manual controls 197 may be used to deactuate the automatic controls and enter the manual mode. In the manual mode, (1) the crank shaft 64 may be actuated to either the raised position or the lowered position; and (2) the turret 50 is rotated while crank shaft 64 is at the top dead center position, and press clamp system 61 and turret 50 are in their respective raised positions. In the manual operation mode, the core rod head 154 is lowered while the press clamp system 61 is open (while crank shaft 64 is at the top dead center position).

The manual control mode is used during set-up and maintenance operations. For example, during set-up, the air is let out of cylinder 162 to lower the core rod head 154 into the tooling (This is the position shown in FIG. 3C). This procedure is performed to check the alignment and fit of mating tooling parts.

The cam actuated indexer 148 is mounted at a fixed height, in contrast to the turret head 154, which moves vertically. Indexer 148 is used in conjunction with a ball spline 150 and nut 152 (shown in FIG. 3B). The ball spline 150 is attached to the turret shaft 142, and the spline nut 152 is attached to the indexer 148. The ball spline 150 and nut 152 permit vertical motion of the turret head 154 relative to the indexer 148, but prevent relative rotation between the turret head and indexer output shaft. The ball spline 150 is provided with suitable lubrication. Thus, vertical motion of the turret head 154 is permitted while the indexer 148 induces rotation.

In the exemplary embodiment, ball spline 150 is connected to the turret shaft 142 by means of expansion type locking-rings 166 and 168 for ease of installation. The turret shaft 142 and turret head 154 are linked together by means of expansion type locking-rings 170. It is contemplated that other means may be used to fasten ball spline 150 to shaft 142, and to fasten turret shaft 142 to turret head 154.

The turret shaft 142 is guided by lubrication free bearings 172. The turret head 154 is the prime mover of articles 27 from preform to finished article in this two step process. The turret head alignment is positively guided and maintained in a fixed rotational position only when the turret 50 has nearly reached the lowered position.

This is accomplished by the use of a combination of two guide/thrust posts 174 (one of which is shown in FIG. 3B) located adjacent to the parison forming station and 120 degrees apart from one another. Guide posts 174 are anchored to the machine table/frame 180.

The exemplary embodiment also includes means for sensing the rotational angle of turret head 154 during a period which is (a) after the crank shaft has rotated approximately 270 degrees from the bottom dead center position; and (b) before the crank shaft returns to the lowered position. As noted above, rotation of the turret head 154 is completed by the time the crank shaft 64 has rotated 270 degrees from the bottom dead center position. If the angle differs from the nominal angle by more than a narrow tolerance range, further lowering of the press clamp system 61 is immediately halted to protect the machine 20.

In the exemplary embodiment, a third guide post 176 (shown in FIG. 3A) acts as a mechanically actuated switch for a turret head safety device. Third post 176 provides a means for sensing the angle through which the turret head 154 rotates. This third post 176 is spring loaded in the extended position and is received by a matching opening 178 in the turret head 154. Opening 178 is sized so that it can only receive third post 176 if the angular position of turret head 154 is within a limited tolerance of the nominal position. Any positional error of the turret head 154 causes turret head 154 to depress the post 176, which in turn triggers generation of an electrical signal to interrupt the machine cycle and immediately terminate rotation of the crank shaft 64. The height of the third post 176 is slightly greater than the height of the two guide posts 174, so that this safety switch of post 176 is actuated before the turret reaches posts 174.

It is understood by one skilled in the art that other conventional angle sensors (e.g., a rotary encoder) may be used to sense the angle between turret head 154 and the machine table/frame 180.

The exemplary turret head 154 accepts adapters of various sizes. These are used interchangeably to allow for longer, shorter or varying numbers of core rods 26 while maintaining the optimum "centerline of pressure" over the length of core rods 26. Parison clamping mechanism 100 is designed so that the centroid of the projected area of the parison cavity (the center of pressure) coincides with the center of reaction of the clamping force applied by parison clamping mechanism 100.

Another aspect of the turret head 154 is the trigger bar (not shown) which may also change depending on the core rod spacing. The trigger bar is pneumatically actuated to a predetermined set point to open the core rods and allow pressurized air to pass into the preform, positioned in the blow mold cavity for final forming. A bleed off sensor monitors maximum cavity air pressure, which must be attained; otherwise an audio alarm alerts the machine operator to a possible process error.

The turret head 154 also includes a pneumatically actuated trigger bar lock (not shown) which maintains the core rods in the open position, providing continuous venting during transfer from blow mold 31 to the eject/stripper station 40. Once the articles 27 have been removed, the open core rods 26 may be conditioned by the internal flow of pressurized air. The turret design and mounting also allows easy access of conditioning lines by way of a rotary union (not shown) to provide liquid thermal transfer fluid to the core rods 26.

EJECT STATION

Figure 6A:
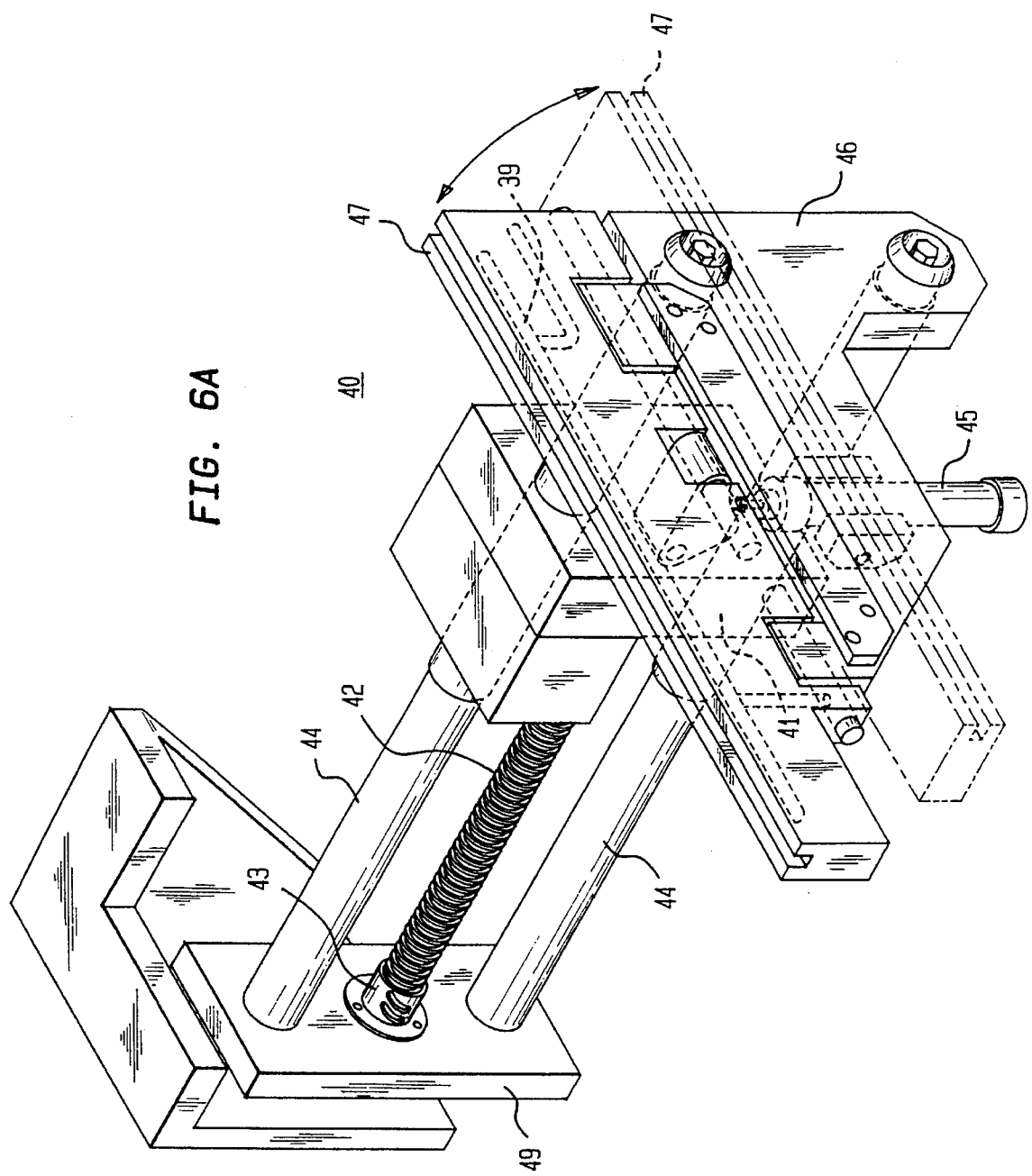
FIG. 6A is an isometric view of the stripper shown in FIG. 1A.
Figure 6B:
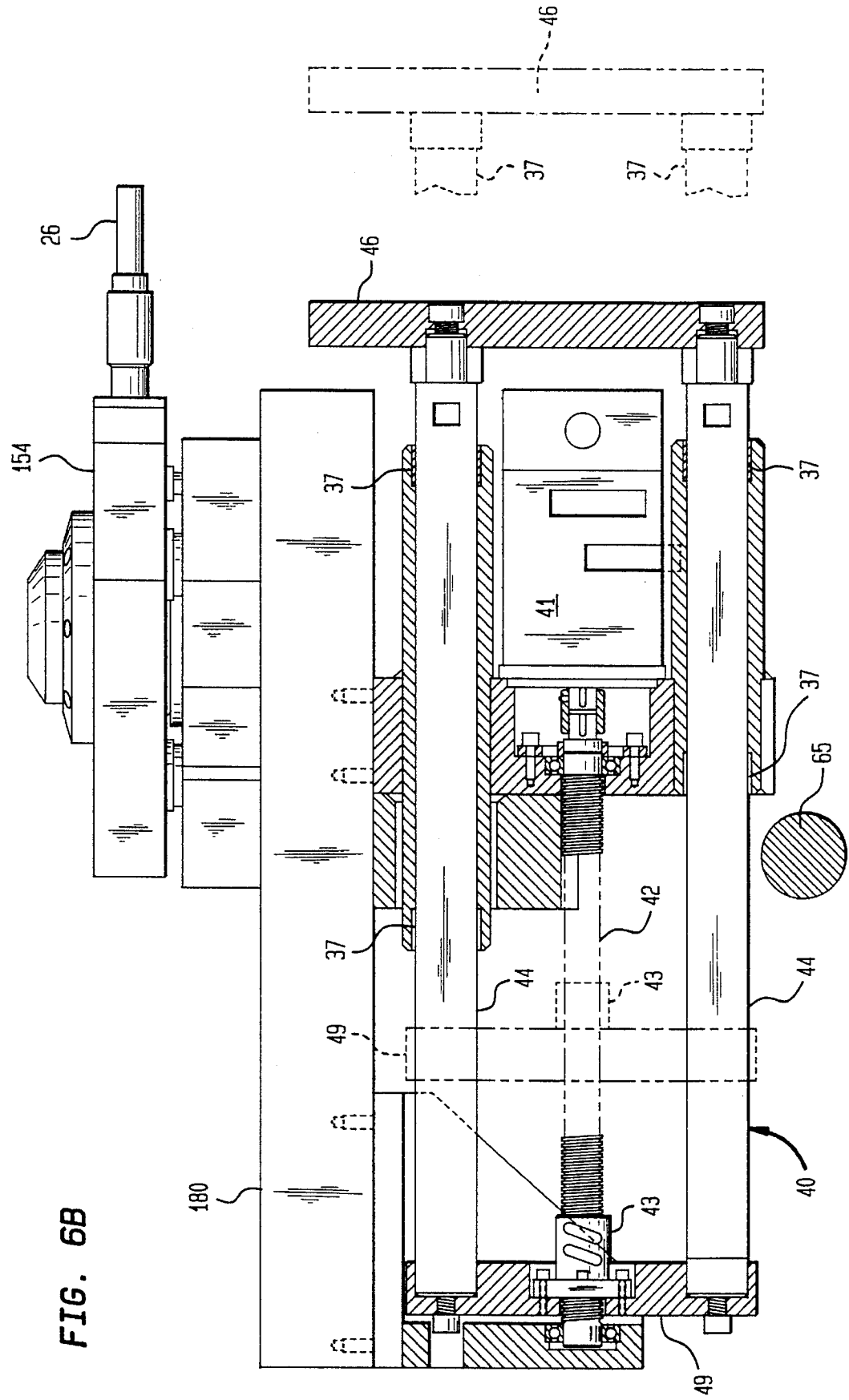
FIG. 6B is a cross sectional view of the stripper shown in FIG. 6A.

FIGS. 6A–6C show the eject/stripper mechanism 40. The eject/stripper mechanism 40 uses two distinct movements to remove finished articles 27 from machine 20. The first movement is a horizontal lateral motion which slides the finished articles 27 away from the center of turret 50 to the ends of the core rods 26. The second movement is a rotation which removes the horizontal articles 27 from the core rods 26 and orients them in a vertical direction. For example, if the articles 27 are bottles, the rotation leaves the neck of the bottles facing upward. The eject/stripper mechanism 40 comprises: an electric servo motor 41; a ball screw shaft 42 attached to motor 41; a ball nut 43 which moves along shaft 42; a plate 49 and two guide shafts 44 attached to ball nut 43; a stripper plate 46 attached to the guide shafts 44; a stripper bar 47 pivotably mounted to plate 46; a pick-off 48a detachably mounted to stripper bar 47; and a pneumatic cylinder 45 for rotating the stripper bar 47. The pick-off 48a is a replaceable insert that is tailored to fit the specific type of bottle being formed, and is attached to stripper bar 47 by a mounting 48.

The removal operation begins with the stripper mechanism 40 in the retracted position as shown by solid lines in FIG. 6B. With the stripper mechanism 40 in the retracted position, the stripper bar 47 and pick-off 48a are oriented vertically, as shown in FIGS. 1A and 1B, and by solid lines in FIGS. 6A. The turret 40 transfers the finished articles 27 (held in place by the core rods 26) to the stripper station 40.

At this point, the turret head 154 descends to the lowered position, carrying the finished articles 27. Thus the articles 27 engage the pick-off 48a of stripper bar 47, as shown in FIG. 6C. Once pick-off 48a engages the finished articles 27, the stripper plate 46 is extended to a predetermined position (shown in phantom in FIG. 6B), effectively removing the finished article from the core rods 26. In the exemplary embodiment, this horizontal motion is performed by actuation of motor 41 to rotate ball screw shaft 42. This rotation causes ball nut 43 (and the plate 49 attached thereto) to advance towards the position shown in phantom in FIG. 6B. Plate 49 is attached to stripper plate 46 via the two guide shafts 44, so that plate 49, plate 46 and bar 47 move together. Thus, actuation of plate 49 provides the desired extension of stripper bar 47.

At this point, the finished articles 27 are still held in a horizontal orientation by the pick off, as shown in FIG. 6C. The pneumatic cylinder 45 is now extended, so as to rotate the stripper bar 47, the pickoff 48a and the finished articles 27 a full 90 degrees (as shown in FIG. 6D), thus orienting the articles 27 vertically for placement onto a take-away conveying system (not shown).

Once the articles 27 are removed from the pickoff 48a, the motor 41 rotates ball screw shaft 42 to retract plate 49, thereby retracting guide shafts 44 and stripper plate 46. The stripper bar 47 and pick-off 48a begin to retract while maintaining a horizontal orientation. The stripper bar 47 and pick-off 48a remain in the horizontal position until a pre-set distance is traveled, thus effectively disengaging from the finished articles 27 before returning the pick-off to the vertical position. At a pre-set point during retraction, (but only after complete disengagement) the stripper bar 47 and the pick-off 48a rotate to their original vertical orientation.

The retraction of the stripper plate 46 and rotation of stripper bar 47 must be accomplished by the time turret 50 rotates to transfer the next set of finished articles 27 to eject station 40.

A safety feature is included in the stripper mechanism, to prevent damage to the mechanism from occurring if the stripper bar 47 becomes stuck in the horizontal position. A link 51 connects the end 45a of the shaft of cylinder 45 to the stripper bar 47. Link 51 includes a first portion 51a that is pinned to the end 45a of the cylinder shaft 45b, and movable therewith. A second portion 51b of link 51 is connected to the stripper bar 47 and movable therewith. Both first and second portions 51a and 51b pivot about a hinge pin 51d. During normal operation, the first portion 51a and the second portion 51b are attached to one another by a conventional tapered detente pin 51c, as shown in FIGS. 6C and 6D. Normally, portions 51a and 51b move together as a single link, so that extension of cylinder 45 lowers stripper bar 47 to the horizontal position (FIG. 6D) and retraction of cylinder 45 raises bar 47 to the vertical position.

The tapered detente pin 51c is positioned in a tapered hole 51e, and is designed to slide out of hole 51e if the transverse (shear) loading on the pin 51c exceeds a threshold value. This may occur if, for example, the stripper bar 47 becomes stuck in the horizontal position, or if a bottle 27 were stuck on a core rod 26. Once the detente pin 51c is ejected, first portion 51a pivots about hinge pin 51d independently of the position of second portion 5lb. This allows the cylinder shaft 45b to retract while stripper bar 47 (which is attached to second portion 51b and movable therewith) to remain in the horizontal position, as shown in FIG. 6E.

An angle sensor (not shown) may be used to measure the angular displacement between first portion 51a and second portion 51b. The output signal from the sensor may be used to turn the machine 20 off, if the link 51 is in the position shown in FIG. 6E.

Another aspect of the stripper mechanism 40 is the provision of air passages 39 to the pick-off 48a, allowing for external conditioning of the core rods 26 at a predetermined point during the retraction of stripper plate 46. The stripper mechanism 40 is supported and guided by lubrication free bearings 37.

Optional features of eject stripper mechanism 40 may include variable velocity selection, position monitoring, variable extension, cooling, and retraction position settings, and variable torque setting. The external conditioning air may also be used to eject bottles with the pick-off 48a in the extended position.

A core rod detection system (not shown) is comprised of two photoelectric emitters and two opposed receivers. They are mounted to the machine table at the stripper station. They are manually and independently adjustable in the vertical and horizontal axis. The function of these sensors is to detect any portion of the blown articles 27 that may still be attached to the core rods 26, either at or before the completion of the stripping cycle. If this detection system is triggered during the appropriate cycle set points, the machine cycle is interrupted.

PLASTIFIER

FIG. 1A shows the plastifier 199, which may be of a conventional design typical of those used on any injection blow molding machine; a detailed view of the plastifier 199 is not provided. An exemplary plastifier assembly includes a heated barrel; a feedscrew movable within the barrel; a spherical roller thrust bearing assembly for carrying axial loading to the feedscrew while the feedscrew rotates; a first electric motor having a drive motor-reducer which applies rotational force to the feedscrew and is mounted on the thrust housing; and a structure in which the barrel is mounted, the structure including front and back platens with tie bars. The main thrust bearing assembly mounts between the platens and is guided by the tie bars with self lubricated bushings.

The axial motion and thrust control of the feedscrew is effected by moving the thrust bearing housing with respect to the platen/tie bar assembly using two ball screws and nuts driven by second and third electric motors. The ball screws are mounted such that the thrust bearings are on the rear platen and the preloaded ball nuts are on the main thrust bearing housing. Rotating the ball screws causes axial motion between the thrust bearing housing (carrying the feed screw) and the platen assembly (to which the barrel is mounted). The relative motion between the screw and barrel effects the melt injection cycle.

The control system for machine 20 differs from those used in conventional injection blow molding machines, in that direct motor functions are controlled to operate machine 20. This may be contrasted to prior art machines in which a continuous motor function provides hydraulic pressure, which controls through selective valving.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. In an injection blow molding machine for making hollow plastic articles including a parison mold having top and bottom portions for injecting a parison onto each of a plurality of core rods, and a blow mold having top and bottom portions for blowing said parisons into hollow work pieces, press clamping apparatus comprising:

a rotating crank shaft;

means for translating the rotation of said crank shaft to a vertical reciprocating motion;

a clamp beam connected to said translating means and actuated by rotation of said crank shaft to move between raised and lowered positions which are separated by a fixed stroke; and actuating means connected to the clamp beam for positioning said top portion of each of said parison and blow molds relative to said clamp beam, so that a distance between the top and bottom portions of each respective mold is less than said stroke while said clamp beam is in the raised position, whereby a clamping pressure is applied to each of said parison and blow molds when said clamp beam is actuated to the lowered position.

2. A press clamping mechanism according to claim 1, wherein the actuating means include means for applying pneumatic pressure to said parison and blow molds.

3. A press clamping mechanism according to claim 2, wherein a reduced pneumatic pressure that is less than the clamping pressure is applied to the respective top portion of each of said parison and blow molds when said clamp beam is not in the lowered position.

4. A press clamping mechanism according to claim 2, further comprising:

pneumatic supporting means for counterbalancing the weight of the clamp beam, thereby reducing the amount of torque required to rotate the crank shaft when raising the clamp beam.

5. A press clamping mechanism according to claim 1, wherein the translating means include a Scotch yoke mechanism.

6. A press clamping mechanism according to claim 5, wherein the crank shaft has an axis of rotation, and a portion of the crank shaft is parallel to and displaced radially from the axis of rotation, said portion being surrounded by said Scotch yoke mechanism.

7. An injection blow molding machine for making hollow plastic articles comprising:

a parison mold having top and bottom portions for injecting a parison onto each of a plurality of core rods;

a blow mold having top and bottom portions for blowing said parisons into hollow work pieces;

an eject station at which the articles are removed from the core rods;

a turret on which the plurality of core rods are mounted, said turret rotating to advance the core rods from the parison mold to the blow mold, and from the blow mold to the eject station;

a rotating crank shaft;

means for translating the rotation of said crank shaft to a vertical reciprocating motion;

a clamp beam connected to said translating means and actuated by rotation of said crank shaft to move between raised and lowered positions which are separated by a fixed stroke; and actuating means connected to the clamp beam for positioning said top portion of each of said parison and blow molds relative to said clamp beam, so that a distance between the top and bottom portions of each respective mold is less than said stroke while said clamp beam is in the raised position, whereby a clamping pressure is applied to each of said parison and blow molds when said clamp beam is actuated to the lowered position.

8. An injection blow molding machine according to claim 7, wherein the actuating means include means for applying pneumatic pressure to said parison and blow molds.

9. An injection blow molding machine according to claim 8, wherein a reduced pneumatic pressure that is less than the clamping pressure is applied to the respective top portion of each of said parison and blow molds when said clamp beam is not in the lowered position.

10. An injection blow molding machine according to claim 9, wherein the reduced pneumatic pressure is applied to the respective top portion of each of said parison and blow molds during a first period immediately after said clamp beam is placed in the lowered position, and during a second period immediately before said clamp beam is moved from the lowered position.

11. An injection blow molding machine according to claim 8, further comprising:

pneumatic supporting means for counterbalancing the weight of the clamp beam, thereby reducing a torque that is applied to rotate the crank shaft when raising the clamp beam.

12. An injection blow molding machine according to claim 7, further comprising means for coupling the turret to the crank shaft, to raise the turret when the clamp beam is raised, and to lower the turret when the clamp beam is lowered.

13. An injection blow molding machine according to claim 12, further comprising:

means for rotating the turret while the clamp beam is not in the lowered position.

14. An injection blow molding machine according to claim 12, wherein the coupling means comprises:

an eccentric cam attached to said crank shaft, a cam follower engaging said cam, and an arm on which said cam follower is rotatably mounted, said arm being attached to said turret for raising and lowering said turret when said crank shaft rotates.

15. An injection blow molding machine according to claim 14, wherein said arm raises said turret by a distance that is approximately one half of the fixed stroke separating the raised and lowered positions of the clamp beam.

16. An injection blow molding machine according to claim 14, wherein said turret is attached to said arm at an end thereof, the machine further comprising:

a slide to which the other end of said arm is pivotably attached, said slide providing a fulcrum for said arm; and a pneumatic cylinder coupled to said slide, allowing said slide to move upward only if a downward force that is greater than a predetermined threshold is applied to said turret.

17. An injection blow molding machine according to claim 14, further comprising:

means for sensing a loss of contact between said cam and said cam follower and for generating a signal indicating loss of contact; and means responsive to said signal for terminating operation of said machine.

18. An injection blow molding machine according to claim 7, wherein said crank shaft has:

a first position, at which the clamp beam is in the lowered position, a second position approximately 90 degrees from said first position, and a third position approximately 270 degrees from said first position;

said machine further comprising:

automatic control means for automatically rotating said crank shaft, and for rotating said turret while said crank shaft is between the second position and the third position.

19. An injection blow molding machine according to claim 18, further comprising:

means for deactuating the automatic control means;

manual control means for rotating the crank shaft to the raised position, and for raising said turret, rotating said turret and lowering said turret while said crank shaft is in the raised position.

20. An injection blow molding machine according to claim 7, wherein said eject station has a stripper for removing finished articles from said core rods, said stripper including:

(a) a stripper bar for engaging the finished articles, (b) a servo motor for actuating the stripper bar horizontally to move the finished articles away from the core rods, and (c) a pneumatic cylinder for rotating the stripper bar so that the articles are oriented vertically.

21. An injection blow molding machine according to claim 7, wherein:

the translating means include a Scotch yoke mechanism, the crank shaft has an axis of rotation, and a portion of the crank shaft is parallel to and displaced radially from the axis of rotation, said portion being surrounded by said Scotch yoke mechanism.

22. An injection blow molding machine according to claim 7, further comprising:

means for sensing an angle through which said turret rotates;

means responsive to said sensing means for discontinuing operation of said machine if said angle through which said turret rotates is either:

(1) less than a minimum angle, or (2) greater than a maximum angle.

23. An injection blow molding machine according to claim 22, wherein said sensing means includes means for sensing said angle during a period:

(a) after said crank shaft has rotated approximately 270 degrees from a position at which the clamp beam is in the lowered position, and (b) before said crank shaft returns to the lowered position.

24. An injection blow molding machine according to claim 22, wherein said sensing means is a mechanically actuated switch that is actuated by said turret, if the angle through which said turret rotates is not between said minimum and maximum angles.

25. In an injection blow molding machine for making hollow plastic articles including a parison mold having top and bottom portions for injecting a parison onto each of a plurality of core rods, and a blow mold having top and bottom portions for blowing said parisons into hollow work pieces, press clamping apparatus comprising:

a rotating crank shaft;

means for translating the rotation of said crank shaft to a vertical reciprocating motion;

a clamp beam connected to said translating means and actuated by rotation of said crank shaft to move between raised and lowered positions which are separated by a fixed stroke; and the top portion of each of said parison and blow molds fixed to and spaced from said clamp beam at a distance such that the distance between the top and bottom portions of each respective mold is less than said stroke while said clamp beam is in the raised position.

26. An injection blow molding machine with clamping apparatus, as recited in claim 25, further including at least one clamping pressure means, disposed between said clamp beam and the top portion of one of said molds, said clamping pressure means, upon actuation thereof, applying additional clamping pressure to said mold top.

27. An injection blow molding machine with clamping apparatus, as recited in claim 26, wherein said clamping pressure means is a pneumatic piston.

* * * * *